United States Patent [19]

Goyal

[11] Patent Number: 4,961,840
[45] Date of Patent: Oct. 9, 1990

[54] ANTIFOAM PROCESS FOR DELAYED COKING

[75] Inventor: Shri K. Goyal, Naperville, Ill.

[73] Assignee: Amoco Corporation, Chicago, Ill.

[21] Appl. No.: 337,252

[22] Filed: Apr. 13, 1989

[51] Int. Cl.$^5$ ............................................. C10G 9/14
[52] U.S. Cl. ................................. 208/131; 208/48 AA
[58] Field of Search ........................... 208/131, 48 AA

[56] References Cited

U.S. PATENT DOCUMENTS

| | | | |
|---|---|---|---|
| 3,700,587 | 10/1972 | Hyde | 208/131 |
| 3,956,101 | 5/1976 | Hara et al. | 208/131 X |
| 3,960,704 | 6/1976 | Kegler et al. | 208/131 X |
| 4,012,109 | 9/1986 | Dillon et al. | 208/131 |
| 4,080,283 | 3/1978 | Naguchi et al. | 208/131 |
| 4,176,052 | 11/1979 | Bruce et al. | 208/131 |
| 4,334,980 | 6/1982 | Hsu | 208/131 X |

*Primary Examiner*—Glenn Caldarola
*Attorney, Agent, or Firm*—Robert E. Sloat; William H. Magidson; Ralph C. Medhurst

[57] ABSTRACT

An improved delayed coking process using an improved method for adding antifoam materials to the delayed coking process. The process is directed to injecting a polysiloxane antifoam material in mixture with an inert gas in the absence or substantial absence of steam and wherein this mixture is heated and thereafter injected into a delayed coking drum. The process allows improved use of antifoam materials and prevents downstream contamination of process units with silica materials which can be broken down when the polysiloxane antifoam material is contacted with large quantities of steam within the coking drum.

27 Claims, 2 Drawing Sheets

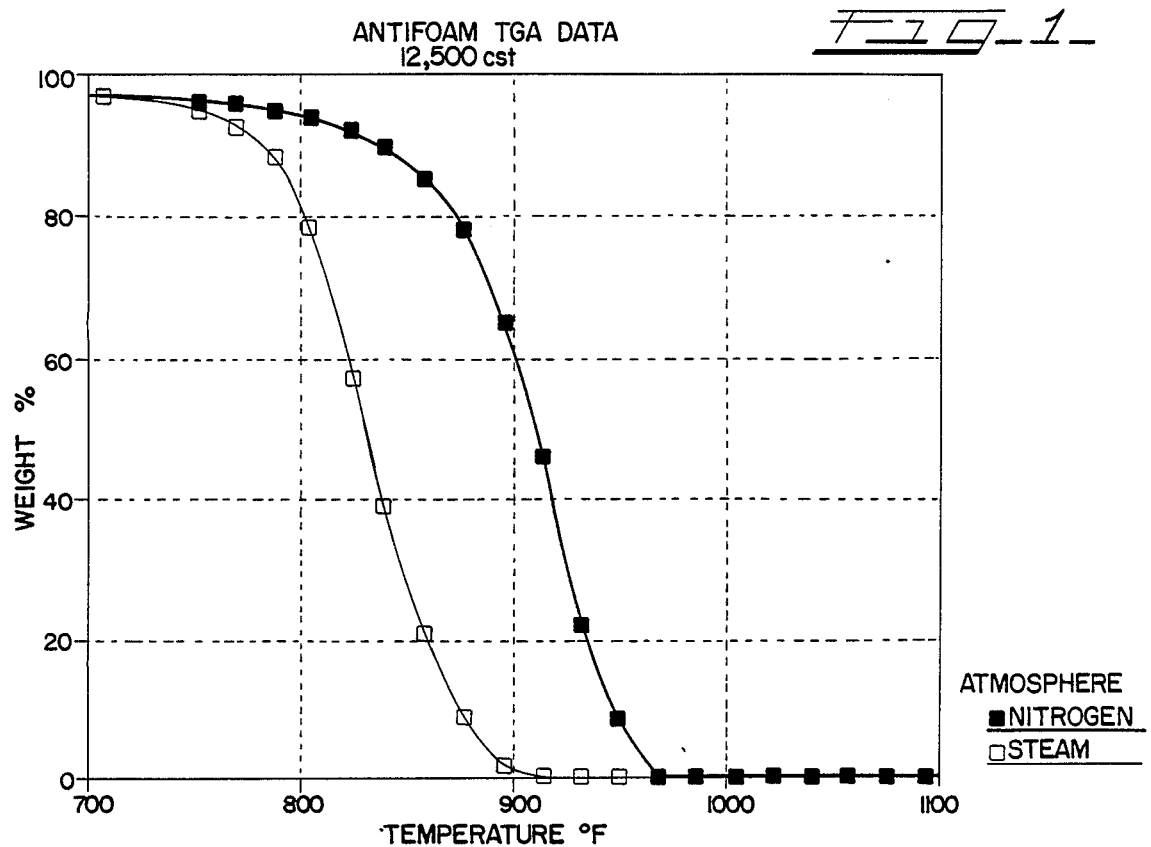
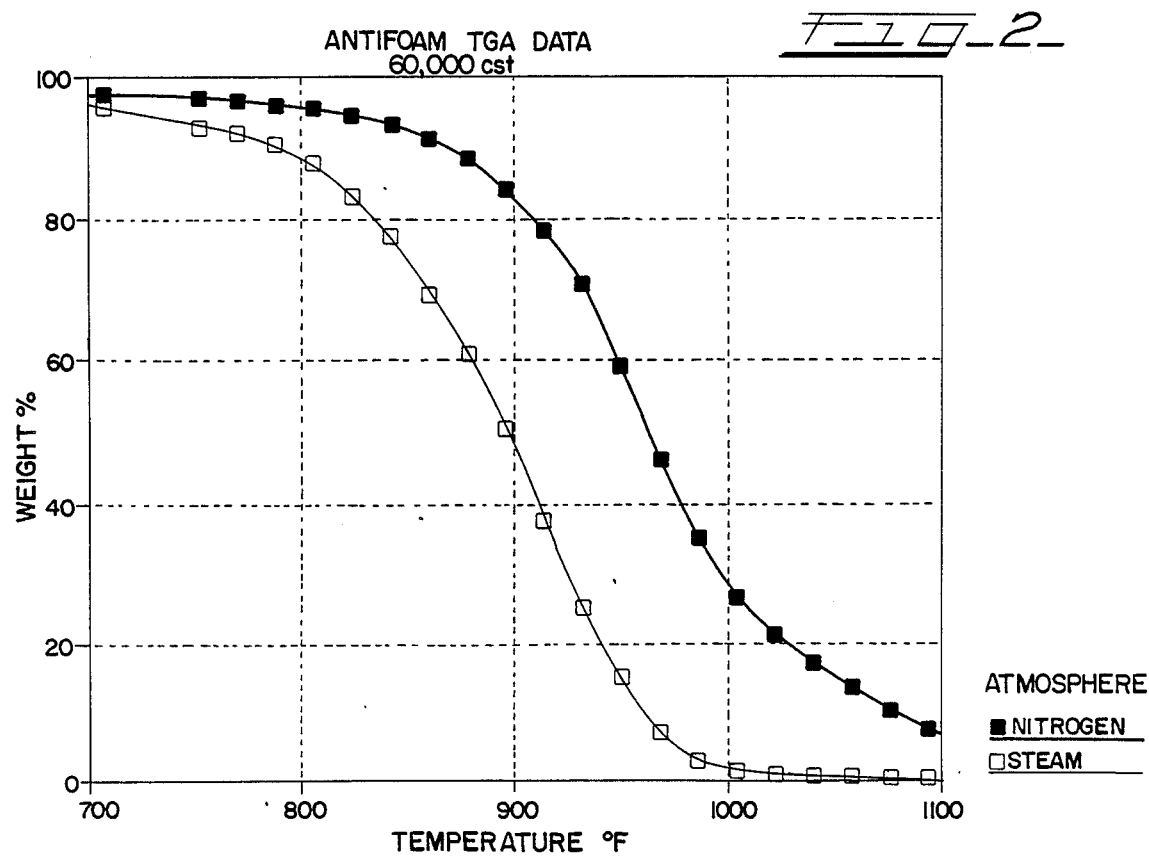

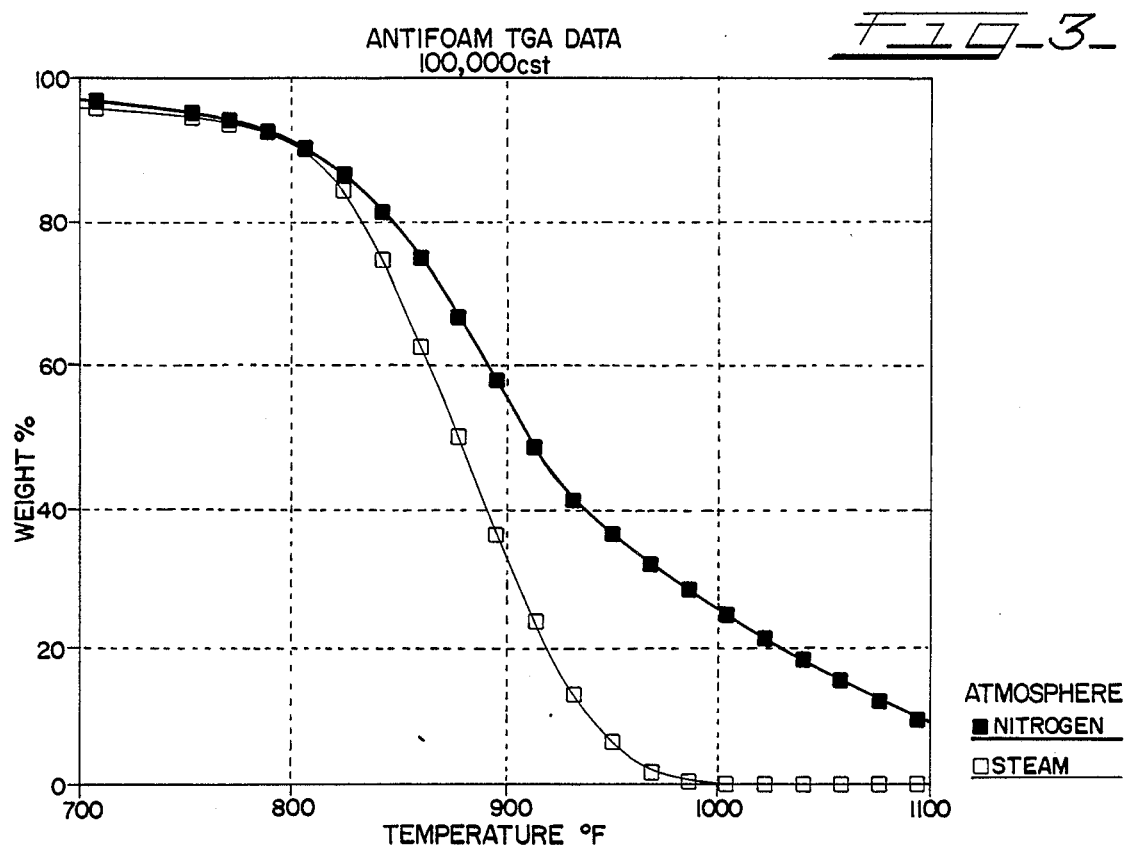
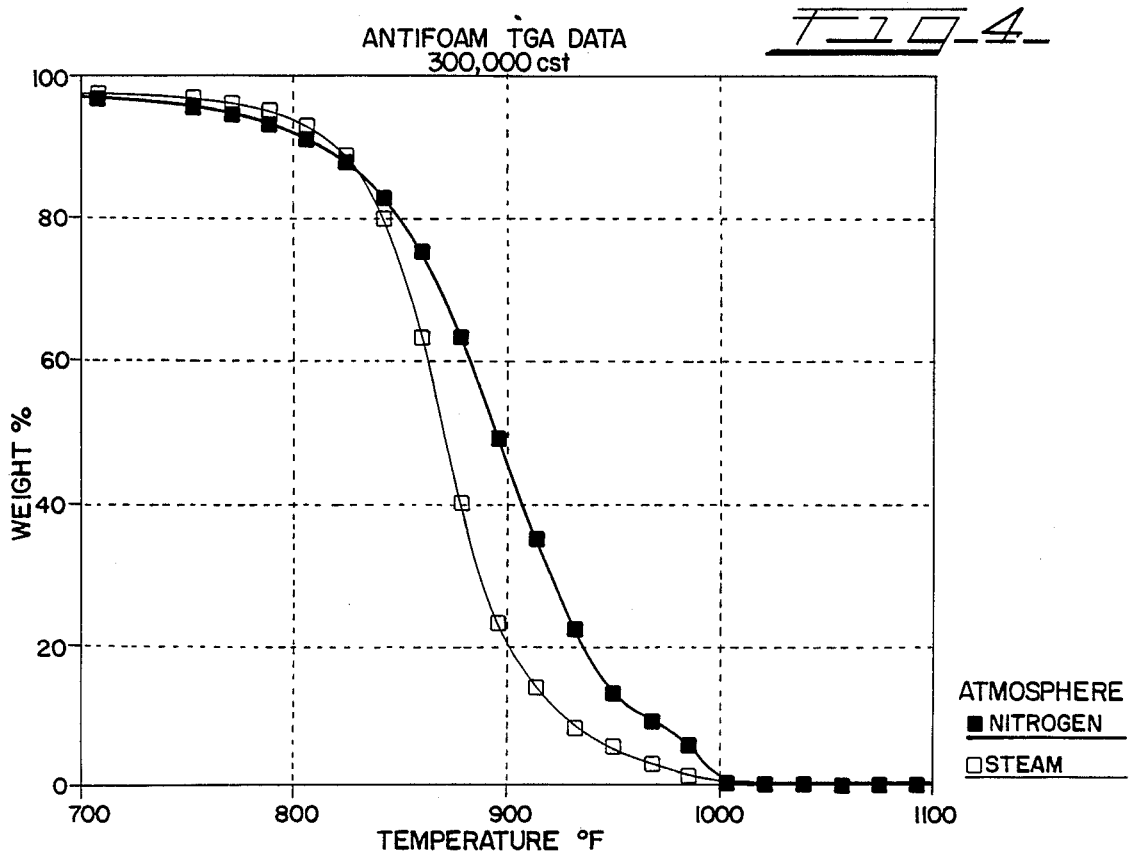

ANTIFOAM PROCESS FOR DELAYED COKING

BACKGROUND OF THE INVENTION (1) Field of the Invention

This invention relates to an improved delayed coking process using antifoam additives to reduce foaming in the process.

(2) General Background

Delayed coking operations in most modern refineries produce solid coke, gaseous and liquid products from heavy residual oil feedstocks. In the usual application of this process, a heavy residual oil is heated in a furnace, passed through a transfer line and discharged into the bottom of a vertically positioned coke drum. A certain amount of steam accompanies the feed passing into the coke drum to maintain appropriate velocity through the furnace and the transfer line to help reduce fouling on these hot lines.

In the coke drum, the residual feedstock is thermally decomposed to a very heavy tar or pitch which further decomposes into solid coke and vapor materials. The vapors are recovered from the delayed coking drum, and a solid coke material is left behind. After a period, the feed to the coke drum is stopped and routed to another drum where the coking continues. The original coke drum is then purged, cooled and opened so that solid coke inside can be removed.

The vapor products removed from the coke drum are passed to fractionation means, and the recovered liquids pass to other processing units in the refinery. These units include hydrotreaters, desulfurizers, reformers, hydrocrackers or fluidized catalytic cracking units which upgrade the liquids.

During normal delayed coking operations, quantities of foam are produced in the coke drum. This is undesirable since the foam diminishes the efficient operations of the process. During the latter stages of the coke-producing cycle, when the coke drum becomes full of solid coke, the foam which is accumulating at the top of the coke bed can eventually be entrained with vapors leaving the coke drum and be carried over into the fractionation section To control the foam in the delayed coking process, it is customary to treat the materials within the coke drum during the coking cycle with antifoam agents. The typical antifoam agents are the silicone-containing polymers which typically have viscosities, when measured by conventional known methods, varying anywhere from about 12,000 up to about 300,000 centistokes. The preferred silicone polymer is polydimethyl siloxane.

Addition of the siloxane polymer reduces the surface tension of the foam in the coke drum causing it to break, thereby reducing or eliminating its presence. The antifoam agents are added during the last few hours of the delayed coking cycle—at a point when the foam level in the coke drum is approaching the upper portion of the coke drum.

The antifoam materials are generally added to the upper portion of the coke drum either through its side wall or through the head of the coke drum. Normally, the antifoam agents are circulated externally through a closed loop and injected into the upper portion of the coke drum at an appropriate time.

In order to prevent coking and eventual plugging of the lines that carry the antifoam agents into the coke drum, they are normally purged with steam because near the coke drum their wall temperatures can be as high as 800 to 900° F. depending upon the refiner's operations at the coker. A typical and inexpensive purge that refiners use is steam, which allows enough velocity in these lines to prevent plugging through deposition of coke. When anti-foam materials are to be injected into the coke drum, a valve will open and inject the circulating antifoam agent along with the steam purging material into the coke drum where it can contact the foam and reduce or eliminate its presence.

One of the problems associated with using steam as a purge is that it adversely affects stability of the polysiloxane polymer causing it to break down or decompose into more volatile silicon-containing materials which are carried away with the vapors leaving the coke drum. This silicon can contaminate downstream processes which are fed the liquids recovered from the coke drum.

Silica poisoning of these processes is expensive to the refiner, since product quality can suffer. To overcome the poisoning generally associated with silica, catalyst must often be regenerated or replaced.

U.S. Pat. No. 3,700,587, issued Mar. 1, 1971 Class 208-131 discloses in general the use of silicon antifoam material for use in delayed coking process units.

U.S. Pat. No. 4,404,092, issued Sept. 13, 1983 relates to a general delayed coking process.

The following article discloses the use of silicone materials for defoaming various petroleum processes including delayed cokers: Pape, P. G., "Silicones: Unique Chemicals for Petroleum Processing," *J. Pet. Proc. Inc.*, June 83, pp 1197-1204.

SUMMARY OF THE INVENTION

The present invention can be summarized as an improvement to a delayed coking process in which a mixture comprising polysiloxane and an inert gas is heated prior to being contacted with the contents of the coke drum. In a preferred instance, the mixture of polysiloxane and inert is gas heated up to the temperature of the coke drum in the substantial absence of steams and then discharged into the coke drum where the mixture contacts the hydrocarbon foam. By heating up the mixture of polysiloxane and inert gas in the absence of steam, thermal degradation of the polysiloxane material is substantially reduced or eliminated prior to the mixture being contacted with any of the contents within the delayed coking drum. This minimizes the carryover of more volatile, lighter weight polysiloxane fragments which can contaminate the liquids condensed from the delayed coking drum and subsequent downstream catalytic processing units.

In the conventional operation of delayed coking processes, the polysiloxane antifoam agent is generally injected into the coke drum through an injection line which normally has a continuous steam purge. This contributes to degradation of the polysiloxanes described above.

The advantages of Applicant's present invention are numerous and include substantial reduction or, in some cases, elimination of silicon poisoning of downstream units which process coker liquids, since degradation of the polysiloxane antifoam material is substantially reduced or eliminated through the use of the invention. Additionally, the quantity of polysiloxane antifoam material used can be reduced since less of it is broken down into volatiles and more is available for antifoaming activity in the coke drum.

Applicant's invention still offers advantages, even though there may be quantities of steam present in the coke drum resulting from steam addition to the feed or other sources in the coke drum. In this case, the polysiloxane material can be heated up to a temperature approaching the coke drum contents when mixed with the inert gas and in the absence of steam prior to being contacted with the foam in the coke drum.

DESCRIPTION OF THE PREFERRED EMBODIMENTS

In a broad embodiment, this invention relates to a delayed coking process wherein a heavy feed is passed into a coking drum at coking conditions including a temperature above about 800° F., to form solid coke and vapor products, wherein foaming of hydrocarbons in the coke drum is inhibited by addition of an effective amount of a polysiloxane to the hydrocarbons, wherein an improvement comprises adding to the coke drum a mixture comprising polysiloxane and an inert gas wherein the mixture has a substantial absence of steam and is heated up to at least 400° F. prior to contacting any of the contents of the coking drum.

In a preferred embodiment, this invention relates to a delayed coking process wherein a heavy feed is passed into a coking drum at coking conditions including a temperature above about 800° F., to form solid coke and vapor products, wherein foaming of hydrocarbons in the coke drum is inhibited by addition of an effective amount of a polysiloxane having an empirical formula as follows:

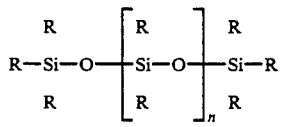

where n is up to 2500 and each R group is independently selected from methyl, ethyl, propyl, lower alkyl (up to five about carbon atoms) having one or more hydroxy groups, lower alkyl (up to about five carbon atoms) having one or more halogen groups, or phenyl, wherein an improvement comprises adding to the coking drum a mixture comprising said polysiloxane and an inert gas, wherein the mixture has a substantial absence of steam and is heated to at least above about 750° F. in an isolated heating zone located within the coking drum and thereafter is discharged from said heating zone into the coking drum and admixes with hydrocarbon material in the coking drum.

Coking conditions include the use of a heavy residual hydrocarbon such as vacuum resid or other similar materials which pass into the coking drum through a transfer line maintained at a temperature anywhere from around 850° to about 970° F., preferably around 900 to 950° F. For production of needle coke where decanted oil feedstocks are used, the transfer line temperature will be higher—generally from about 930° to about 970° F. Pressures within the coking drum are generally regulated anywhere from around atmospheric to about 250 psig but preferably from about 15 to about 150 psig. Vapor residence time in the coke drum can vary anywhere from a few seconds up to two or more minutes. Stripping steam can be added to the feed passing into the coke drum to help maintain appropriate velocities in the feed furnace or within the coke drum and can be added at rates anywhere from about 0.2 up to about 5 or more pounds of steam per 100 pounds of total feed passing into the coke drum.

The antifoaming materials used in the present invention generally include siloxane materials and preferably polysiloxane materials. The polysiloxane can have various substitutions along its chain length, preferably these substitutions are lower alkyl groups or halo substituted lower alkyls. Polysiloxane materials generally have the following empirical formula:

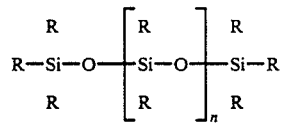

where n is up to about 2500 or more and each R group is as described above.

The value of n can vary anywhere from a relatively small number up to about 2500 or more and can be controlled to vary the viscosity of the material. In most cases the viscosity of the polysiloxane materials can vary anywhere from a few thousand centistokes up to about 300,000 or more centistokes. The preferred polysiloxane material is polydimethyl siloxane having a viscosity anywhere from about 12,000 up to about 100,000 centistokes.

The R groups can all be the same or can be selected independently from preferably methyl and ethyl. The most preferred R is methyl.

The use of the siloxane antifoam material generally requires that it be diluted in a relatively light hydrocarbon. For use in the delayed coking processes the siloxane is generally diluted in kerosene or an equivalent hydrocarbon material. The polysiloxane can vary anywhere from 1 to about 30 or more weight percent of the total mixture of polysiloxane and hydrocarbon diluent material. When referring to polysiloxane addition in this specification and claims, Applicant generally means use of the hydrocarbon diluent.

The polysiloxane antifoam material can be added to the coking drum in a number of different ways. One preferred method is to inject the polysiloxane into the coke drum through an injection tube which can pass through the upper portion of the drum's side wall or through the top of the coke drum extending down into the coke drum. The injection tube is of sufficient length to place its exit positioned so that the injected antifoam material can be in close proximity to the hydrocarbon foam which is produced during the latter stages of the coking cycle. In most cases this tube can be anywhere from a few inches to 20 feet long and can have an inside diameter ranging anywhere from one-half to three or more inches.

One of the advantages of using an injection tube to inject polysiloxane into the coking drum is that the portion which extends into the drum will heat the mixture of polysiloxane and inert gas close to the temperature of the drum's contents prior to the mixture being contacted with the hydrocarbon foam in the drum. This also minimizes contact of the polysiloxane with any steam which is present in the hydrocarbon vapors in the coking drum.

Another method of polysiloxane addition is to inject it through existing pressure venting lines which are normally connected to the head of the coke drum.

The polysiloxane material can be stored in any well-recognized or known storage tank means. A pump is connected to the storage means with appropriate piping to allow the pump to freely circulate the polysiloxane and hydrocarbon diluent through a continuous loop. At an appropriate time a valve can be opened to inject polysiloxane and the hydrocarbon diluent into the coking drum along with the appropriate quantity of inert gas. In a preferred instance, the inert gas is nitrogen, although it can be selected from any number of materials including methane. Other inert materials include helium, argon and various light refinery fuel gases which can comprise mixtures of hydrogen, methane, ethane, ethylene and higher hydrocarbons.

When an injection tube is used to inject polysiloxane into the coking drum, it can be referred to as an isolated heating zone since the tube is in contact with the hot vapors or liquids in the coke drum. These materials can vary in temperature anywhere from 750 to up to 900° F and by contact with the tube can heat up the material with passing into the coking drum.

The isolated heating zone can also be defined as certain of the piping which carries the polysiloxane and inert gas mixture into the coking drum even in cases where this piping does not use an injection tube extending into the coking drum. In such cases, the piping will help heat the polysiloxane and inert gas mixture, since the piping is connected to the drum and is normally insulated. It can approach the temperature of the coking drum side wall or head.

Also, external heat exchange can be used to increase the degree of heating of the polysiloxane and inert gas mixture whether or not an injection tube is used.

It is preferred that the polysiloxane and hydrocarbon diluent be passed into the coking drum along with sufficient inert gas to keep the associated piping from coking and to allow the polysiloxane and inert gas to be heated.

For a half-inch inside diameter pipe, a flow rate of from a few up to about 100 cubic feet per hour of inert gas can be used. A rate of from about 20 to about 100 cubic feet per hour at the coking drum overhead pressure is preferred. The inert gas is regulated to maintain a reasonable velocity within the piping or injection tube which carries the antifoam material into the coking drum. Care must be taken that too much inert gas is not added so as to place additional burden on the gas processing equipment downstream of the coking drum.

On a weight percentage basis, the inert gas can be anywhere from a few up to about 50 percent or more of the total polysiloxane and hydrocarbon diluent added to the coking drum.

The addition rate of the antifoaming material can be anywhere from about 1 ppm up to about 1000 ppm of the polysiloxane when compared to the feed rate passing into the coking drum (on a weight basis) during the period at which defoaming operations are occurring. A preferred range is from about 10 up to about 500 ppm and an even more preferred range is from about 20 up to about 200 ppm. Of course, the concentration of the polysiloxane polymer in the hydrocarbon diluent can vary depending upon its molecular weight or viscosity, and these ranges can pretty much be determined through trial and error techniques when operating a delayed coking process.

The addition of the polysiloxane antifoaming material to the improved coking process is done in the substantial absence of steam. This means that the mixture of polysiloxane (including hydrocarbon diluent) and inert gas can consist essentially of these materials with little or no steam present in this mixture. In a preferred instance, the mixture consists of polysiloxane material along with any hydrocarbon diluent required and the inert gas. The maximum volume percent of steam allowable in this mixture entering the coking drum is about 2 volume percent. For practical considerations, small quantities of steam may be present because of the inability to completely dry the polysiloxane, hydrocarbon diluent material, the inert gas material or other parts of the system that may contain very small quantities of water which eventually ends up as steam.

The mixture of polysiloxane and inert gas when added to the coking drum will be heated up to a temperature of at least about 400° F. The temperature at which the mixture of polysiloxane and inert gas exits the isolated heating zone will vary. When an internal injection tube is used, the exit temperature of mixture will be close to the temperature of the hydrocarbon materials in the top of the coke drum since these materials surround the tube.

If the isolated heating zone is not located within the coking drum, then the temperature of the polysiloxane and inert gas mixture entering the coking drum will often be lower than the vapor contents of the coking drum. In such cases, the mixture temperature can vary anywhere from about 300° F. up to about 850° F. The mixture, however, is heated up to the coking drum temperature when it mixes with the vapors or liquid foam in the drum.

The following Examples are presented to illustrate certain embodiments of the invention but are not presented so as to unduly restrict the scope of the invention as claimed.

EXAMPLE 1

In this Example a DuPont 951 thermogravimetric analyzer (TGA) was modified to measure weight loss of four commercially available siloxanes at various temperatures under purging atmospheres of steam mixed with an inert gas (nitrogen) and nitrogen alone.

The weight loss measured for the various siloxanes represents the degree of decomposition of these materials.

The siloxanes used were all polydimethyl siloxane of varying viscosities produced by General Electric under the brand name Viscasil. The four siloxanes were all tested at 100 percent polydimethyl siloxane concentration with estimated silicon contents of 37 to 38 weight percent. Their viscosities were 12,500, 60,000 100,000 and 300,000 centistokes.

After the siloxane sample was loaded on the TGA sample pan and sealed under a nitrogen purge, weight measurements were made under a pure nitrogen purge and under a purge containing 15 volume percent steam in nitrogen. The siloxane samples varied in weight from about 24 up to about 38 milligrams while the gas purge rate was regulated at approximately 105 milliliters per minute. The TGA unit was programmed to increase temperature at a rate of 10° C. per minute and the weight loss was monitored during the increase in temperature.

The results of these tests are shown in FIGS. 1, 2, 3 and 4 for the various polydimethyl siloxanes described above. These Figures plot temperature versus weight percent of sample retained.

In FIG. 1, a 12,500 centistoke polydimthyl siloxane was tested. There was about a 75° F difference in decomposition temperatures between 20 to 80 percent weight retention of original weight when comparing the nitrogen purge test with the steam purge test.

In FIG. 2, a 60,000 centistoke polydimethyl siloxane polymer was tested. There was about a 68° F. difference in decomposition temperatures between 20 to 80 percent weight retention when comparing the nitrogen purge test with the steam purge test.

In FIG. 3, a 100,000 centistokes polydimethyl siloxane polymer was tested. The difference in decomposition temperatures between 20 to 80 percent weight retention when comparing the nitrogen purge test with the steam purge test varied from 110° F. at 20 weight percent retention of original weight to 10° F. at 80 weight percent retention of the original sample.

In FIG. 4, a 300,000 centistoke polydimethyl siloxane was tested. The difference in decomposition temperatures between 20 to 80 percent weight retention of the original sample when comparing the nitrogen purge test with the steam purge test varied from 29° F. at 20 weight percent retention of original weight to a few degrees at 80 weight percent retention of the original sample.

From the above testing it is shown that all the siloxanes increased their resistance to decomposition when purged with nitrogen in the absence of steam. With 15 volume percent steam in contact with the siloxane, it decomposed to a greater degree at equivalent temperature than the siloxane in the presence of nitrogen alone.

The 60,000 centistoke siloxane showed the test stability, followed by the 100,000 centistoke material. The 12,500 and 300,000 centistoke siloxane showed lowest stability.

This is also illustrated in Table I below where these four siloxanes were compared for the percentage of TGA sample retained at 900° F. under nitrogen and nitrogen steam atmospheres where the 60,000 and 100,000 centistoke siloxane showed the best performance under a steam atmosphere.

TABLE I

| | Weight Percent of Sample Retained at 900° F. | |
|---|---|---|
| Centistokes of Siloxane | Pure Nitrogen Atmosphere | 15 Volume Percent Steam in Nitrogen Atmosphere |
| 12,500 | 60 | 0 |
| 60,000 | 84 | 50 |
| 100,000 | 58 | 35 |
| 300,000 | 46 | 32 |

EXAMPLE 2

In this Example, the siloxane usage at a commercial delayed coking installation was monitored to show decreased usage resulting from practicing the claimed invention.

The delayed coking process operated on normal residual feedstocks to produce fuel grade coke. Four drums were used and the average feed rate to the coking drums over the test period was about 14,000 barrels per stream day. During the last two hours of the coking cycle, when the level of the coke bed was reaching the top of the coke drum, polydimethyl siloxane was injected into the top of the coke drum to reduce the hydrocarbon foam which normally sits on top of the coke bed.

The injection was of a liquid mixture of approximately 2.5 weight percent polydimethyl siloxane having a viscosity of 100,000 centistokes and about 97.5 weight percent kerosine.

The injection was through the coking drum head and involved circulating piping which was connected to the pressure venting system. The injection pipe was insulated where it connected to the drum head and allowed the contents of any materials passing the pipe to be heated up to approximately 400° F. A gas purge was hooked up to the injection pipe and, depending on the operation, was controlled to allow pure nitrogen or moderate pressure steam to be used as the purge material.

During a period of approximately four and one-half months of commercial operations, steam was used as the purge material. Careful monitoring of siloxane usage to maintain proper foam control during the last two hours of the coking cycle, resulted in an average use of polysiloxane of about 120 ppm on a volumetric basis when compared to the feed added to the coking drum during this operation.

A second period lasting for a little over eleven months used a nitrogen purge. Monitoring of the siloxane usage to maintain proper foam control resulted in an average use of polysiloxane of about 60 ppm on a volumetric basis when compared to the feed added to the coking drum during this operation.

I claim:

1. In a delayed coking process wherein a heavy feed is passed into a coking drum at coking conditions including a temperature above about 800° F., to form solid coke and vapor products, wherein foaming of hydrocarbons in the coke drum is inhibited by addition of an effective amount of a polysiloxane to the hydrocarbons wherein an improvement comprises adding to the upper portion of the coke drum a mixture comprising polysiloxane and an inert gas wherein the mixture has a substantial absence of steam to substantially reduce thermal degradation of said polysiloxane and is heated up to at least about 400° F. prior to contacting any contents of the coking drum.

2. The process of claim 1 further characterized in that said polysiloxane comprises polydimethyl siloxane having a viscosity above about 12,000 centistokes.

3. The process of claim 1 further characterized in that said polysiloxane comprises polydimethyl siloxane having a viscosity within the range of from about 12,000 centistokes to about 200,000 centistokes.

4. The process of claim 1 further characterized in that said inert gas comprises nitrogen, and said polysiloxane comprises polydimethyl siloxane having a viscosity within a range of from about 12,000 centistokes to about 200,000 centistokes mixed with a liquid hydrocarbon.

5. The process of claim 1 further characterized in that said polysiloxane comprises an empirical formula as follows:

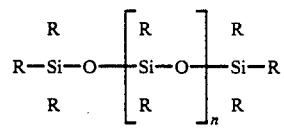

where n is up to about 2500 and each R group is independently at least one member selected from the group of methyl, ethyl, propyl, lower alkyl (up to about five carbon atoms) having one or more hydroxy groups, lower alkyl (having up to about five carbon atoms) having one or more halogen groups, or phenyl.

6. The process of claim 1 further characterized in that said mixture of polysiloxane and inert gas is heated to at least about 750° F. prior to contacting any contents of the coking drum.

7. The process of claim 6 further characterized in that said polysiloxane is polydimethyl siloxane and said inert gas is nitrogen.

8. The process of claim 1 further characterized in that said mixture of polysiloxane and inert gas is heated to at least about 750° F. in an isolated heating zone located within the coking drum and thereafter is discharged from said heating zone and admixes material in the coking drum.

9. The process of claim 8 further characterized in that said polysiloxane is polydimethyl siloxane and said inert gas is nitrogen.

10. The process of claim 7 further characterized in that said polysiloxane has a viscosity above about 12,000 centistokes.

11. The process of claim 9 further characterized in that said polysiloxane has a viscosity above about 12,000 centistokes.

12. The process of claim 7 further characterized in that said polysiloxane is diluted with hydrocarbon material.

13. The process of claim 1 further characterized in that said inert gas is at least one member selected from the group consisting of nitrogen, helium, argon and methane.

14. The process of claim 13 further characterized in that said inert gas comprises nitrogen.

15. The process of claim 1 further characterized in that said inert gas is a refinery fuel gas comprising hydrogen, nethane, ethane and ethylene.

16. In a delayed cooking process wherein a heavy feed is passed into a coking drum at coking conditions including a temperature above about 800° F., to form solid coke and vapor products, wherein foaming of hydrocarbons in the coke drum is inhibited by addition of an effective amount of a polysiloxane having an empirical formula as follows:

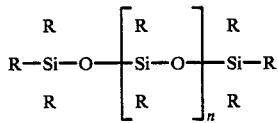

wherein n is up to about 2500 and each R group is independently at least one member selected from the group consisting of methyl, ethyl, propyl, lower alkyl (up to about five carbon atoms) having one or more hydroxy groups, lower alkyl (up to about five carbon atoms) having one or more halogen groups, or phenyl, wherein an improvement comprises adding to the upper portion of the coking drum a mixture comprising said siloxane and an inert gas wherein the mixture has a substantial absence of steam to substantially reduce thermal degradation of said polysiloxane is heated to at least above about 750° F. in a heating zone, and thereafter is discharged from said heating zone into the coking drum and admixed with material in the coking drum.

17. The process of claim 16 further characterized in that R is at least one member selected from the group consisting of methyl, ethyl and propyl and said inert gas comprises nitrogen.

18. The process of claim 17 further characterized in that said polysiloxane has a viscosity in the range of from about 12,000 centistokes up to about 200,000 centistokes.

19. The process of claim 16 further characterized in that said heating zone, located within the coking drum, comprises an elongated injection tube extending into the coking drum and discharges into the drum.

20. The process of claim 19 further characterized in that said polysiloxane is polydimethyl siloxane having a viscosity within the range of from about 12,000 centistokes to about 200,000 centistokes.

21. The process of claim 19 further characterized in that said inert gas comprises at least one number selected from the group consisting of nitrogen, helium, argon and methane.

22. The process of claim 16 further characterized in that said heating zone is located outside of the coking drum and comprises an elongated tube which discharges into the coking drum.

23. The process of claim 22 further characterized in that said polysiloxane is polydimethyl siloxane having a viscosity within the range of from about 12,000 centistokes to about 200,000 centistokes.

24. The process of claim 22 further characterized in that said inert gas comprises at least one member selected from the group consisting of nitrogen, helium, argon and methane.

25. The process of claim 16 further characterized in that said inert gas is a refinery gas comprising hydrogen, methane, ethane and ethylene.

26. The process of claim 1 further characterized in that thermal degradation of said polysiloxane is eliminated.

27. The process of claim 16 further characterized in that thermal degradation of said polysiloxane is eliminated.

* * * * *